United States Patent [19]

Liu et al.

[11] Patent Number: 4,904,404

[45] Date of Patent: * Feb. 27, 1990

[54] LUBRICATING OIL CONTAINING VISCOSITY INDEX IMPROVER

[75] Inventors: Christopher S. Liu, Poughkeepsie; Nicholas Benfaremo, Wappingers Falls; Maria M. Kapuscinski, Carmel; Larry D. Grina, Wappingers Falls, all of N.Y.

[73] Assignee: Texaco Inc., White Plains, N.Y.

[*] Notice: The portion of the term of this patent subsequent to Mar. 14, 2009 has been disclaimed.

[21] Appl. No.: 320,187

[22] Filed: Mar. 7, 1989

Related U.S. Application Data

[63] Continuation of Ser. No. 84,355, Aug. 12, 1987, Pat. No. 4,812,261.

[51] Int. Cl.$^4$ .................................... C10M 149/06
[52] U.S. Cl. ........................ 252/51.5 A; 252/51.5 R; 524/544; 525/327.6; 525/380
[58] Field of Search ............... 252/51.5 A, 51.5 R; 525/327.6, 380; 524/544, 549

[56] References Cited

U.S. PATENT DOCUMENTS

| | | | |
|---|---|---|---|
| 2,837,496 | 6/1958 | Vandenberg | 252/51.5 A |
| 4,068,058 | 1/1978 | Engel et al. | 252/51.5 A |
| 4,132,656 | 1/1979 | De Vries | 252/51.5 A |
| 4,146,489 | 3/1979 | Stambaugh et al. | 252/51.5 R |
| 4,259,086 | 3/1981 | Machleder | 252/51.5 R |
| 4,510,063 | 4/1985 | Chou | 252/51 AA |
| 4,640,788 | 3/1987 | Kapuscinski et al. | 252/51.5 A |
| 4,668,412 | 5/1987 | Hart et al. | 252/51.5 A |
| 4,693,838 | 9/1987 | Varma et al. | 252/51.5 A |

Primary Examiner—Jacqueline V. Howard
Assistant Examiner—Margaret B. Medley
Attorney, Agent, or Firm—Robert A. Kulason; James J. O'Loughlin; Carl G. Seutter

[57] ABSTRACT

A lubricating oil contains, as a multifunctional additive, a polymer such as an ethylene - propylene copolymer, bearing graft moieties derived from allyl glycidyl ether, or glycidyl methacrylate as a graft monomer polymer being functionalized with (i) N-vinyl pyrrolidone and (ii) a Mannich base formed by the reaction p-nonyl phenol, N-(aminoethyl) piperazine, and formaldehyde.

27 Claims, No Drawings

LUBRICATING OIL CONTAINING VISCOSITY INDEX IMPROVER

This is a continuation, of application Ser. No. 07/084,355, filed Aug. 12, 1987 Pat. No. 4,812,261.

FIELD OF THE INVENTION

This invention relates to lubricating oils. More particularly it relates to lubricating compositions characterized by improved oxidative stability, dispersancy, and viscosity index.

BACKGROUND OF THE INVENTION

As is well known to those skilled in the art, it is possible to improve the properties of a lubricating oil by addition of various components. The viscosity index may be improved; the oxidative stability and dispersancy may be improved. Continued efforts are being made to attain improvement in these and other properties, and to attain these improvements at reduced cost. It is an object of this invention to provide an improved lubricating composition. Other objects will be apparent to those skilled in the art.

STATEMENT OF THE INVENTION

In accordance with certain of its aspects, this invention is directed to Mannich base formed by the reaction of (i) an aldehyde, (ii) a polyamine containing at least one primary or secondary amine group and (iii) an non-hindered phenol.

In accordance with certain of its aspects, this invention is directed to a lubricating composition comprising a major portion of a lubricating oil and a minor effective portion of a composition comprising a carbon-carbon backbone polymer containing residual unsaturation, and bearing graft moieties derived from a graft monomer containing ethylenic unsaturation and an epoxide moiety which graft polymer has been functionalized with (a) a Mannich base formed by the reaction of (i) an aldehyde, (ii) a polyamine containing at least one primary or secondary amine group and (iii) a non-hindered phenol and with (b) a functionalizing polyamine bearing a Zerewitinoff active hydrogen atom bonded to a nitrogen atom.

DESCRIPTION OF THE INVENTION

THE POLYMER BACKBONE

The polymers which may be used in practice of this invention may include oil-soluble, substantially linear, carbon-carbon backbone polymers. Typical carbon-carbon backbone polymers prepared from monomers bearing an ethylenically unsaturated polymerizable double bond which may be employed include homopolymers or copolymers prepared from monomer

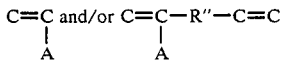

wherein A may be: hydrogen; hydrocarbon such as alkyl, aryl, etc.; RCOO— (such as acetate) or acyloxy (typified by —COOR); halide; etc. R″ may be divalent hydrocarbon typified by alkylene, alkarylene, aralkylene, cycloalkylene, arylene, etc.

Illustrative of such monomers may be acrylates or methacrylates; vinyl halides (such as vinyl chloride); styrene; olefins such as propylene, butylene, etc.; vinyl acetate; dienes such as butadiene, isoprene, hexadiene, ethylidene norbornene, etc. Homopolymers of olefins, (such as polypropylene, polybutylene, etc.), dienes, (such as hydrogenated polyisoprene), or copolymers of ethylene with e.g., butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40-70 mole %, preferably 50-60 mole %, say 55 mole %, the remainder being derived from propylene.

The molecular weight $\overline{M}_n$ of the EPM copolymers which may be employed may be 10,000-1,000,000, preferably 20,000-200,000, say 140,000. The molecular weight distribution may be characterized by a polydispersity index $\overline{M}_w/\overline{M}_n$ of less than about 15, preferably 1.2-10, say 1.6.

Illustrative EPM copolymers which may be employed in practice of the process of this invention may be those set forth in the following table, the first listed being preferred:

TABLE

A. The Epsyn brand of EPM marketed by Copolymer Rubber and Chemical Corporation containing 55 mole % of units derived from ethylene and 45 mole % of units derived from propylene, having a molecular weight $\overline{M}_n$ of 100,000 and a $\overline{M}_w/\overline{M}_n$ of 1.6.

B. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_w/\overline{M}_n$ of 1.6.

C. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

D. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-diene (EPT or EPDM), it may be formed by copolymerization of ethylene, propylene and diene third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 mole %, preferably 50-65 mole %, say 58 mole % and units derived from the propylene in amount of 20-60 mole %, preferably 30-50 mole %, say 40 mole % and units derived from third diene monomer in amount of 0.5-15 mole %, preferably 1-10 mole %, say 2 mole %. The molecular weight $\overline{M}_n$ of the terpolymers may typically be 10,000-1,000,000, preferably 20,000-200,000 say 120,000. Molecular weight distribution of the useful polymers is preferably narrow viz a $\overline{M}_w/\overline{M}_n$ of typically less than 15, preferably 1.5–10, say 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and polydispersity index $\overline{M}_w/\overline{M}_n$ of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and polydispersity index $\overline{M}_w/\overline{M}_n$ of 2.5.

E. The Epsyn 40A brand of EPT marketed by Uniroyal containing 60 mole % of units derived from ethylene, 37 mole % of units derived from propylene, and 3 mole % of units derived from ethylidene norbornene and having a $\overline{M}_n$ of 140,000 and polydispersity index $\overline{M}_w/\overline{M}_n$ of 2.

When the polymer is an acrylate, illustrative acrylate monomers whih may be used in practice of the process of this invention may include the following (and the corresponding methacrylates), the first listed being preferred:

TABLE

| A | methyl | acrylate |
|---|---|---|
| B | propyl | acrylate |
| C | lauryl | acrylate |
| D | stearyl | acrylate |
| E | butyl | acrylate |

THE FIRST MONOMER

The first monomer which may be employed in practice of the process of this invention contains ethylenic unsaturation and an epoxide moiety.

Preferably the first monomer may be characterized by the formula:

wherein

C=C is an ethylenically unsaturated double bond;
$R^v$ or $R^{vi}$ is a divalent hydrocarbon moiety selected from the group consisting of alkylene, alkarylene, aralkylene, cycloalkylene, and arylene;

R' is hydrogen or alkyl, alkaryl, aralkyl, cycloalkyl, or aryl;

R" is a divalent moiety selected from the group consisting of —COO— and —$R^v$—; and a is an integer greater than 0;

b is an integer 0–1;

c is an integer 1–3; and d is an integer 0–1.

In the above formula, R' may be hydrogen or a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butycyclohexyl, 3-methylcyclohexyl, etc. When R' is aryl, it may typically be tolyl, xylyl, etc. R' may be inertly substituted i.e. it may bear non-reactive substituent such as alkyl, aryl, cycloalkyl, etc. Typically inertly substituted R' groups may include 4-methyl cyclohexyl, etc. The preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc. R' may preferably be methyl.

In the above formula, $R^v$ or $R^{vi}$ may be a divalent hydrocarbon radical selected from the group consisting of alkylene, aralkylene, cycloalkylene, arylene, and alkarylene including such radicals when inertly substituted. When $R^v$ or $R^{vi}$ is alkylene, it may typically be methylene, ethylene, n-propylene, iso-propylene, n-butylene, i-butylene, sec-butylene, amylene, octylene, decylene, octadecylene, etc. When $R^v$ or $R^{vi}$ is aralkylene, it may typically be benzylene, beta-phenylethylene, etc. When $R^v$ or $R^{vi}$ is cycloalkylene, it may typically be tolylene, xylylene, etc. $R^{vi}$ may be inertly substituted i.e. it may bear a non-reactive substituent such as alkyl, aryl, cycloalkyl, ether, etc. Typically inertly substituted $R^v$ or $R^{vi}$ groups may include 2-ethoxyethylene, carboethoxymethylene, 4-methyl cyclohexylene, etc. The preferred $R^v$ or $R^{vi}$ groups may be lower alkyl, i.e. $C_1$–$C_{10}$ alkylene, groups including e.g. methylene, ethylene, n-propylene, i-propylene, butylene, amylene, hexylene, octylene, decylene, etc. $R^v$ and $R^{vi}$ may typically be methylene —$CH_2$— or n-propylene —$CH_2CH_2CH_2$—.

In the above formula, R" is a divalent moiety selected from the group consisting of —COO— and —$R^v$—. Preferably R" is —COO—.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if R" is —COO—.

c is an integer 1–3. Preferably c is 1.

d is an integer 0–1. When b and d are both zero, the composition includes a hydrocarbon moiety.

In its preferred aspects, the first monomer may be characterized by the formula

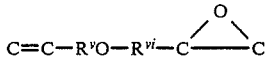

Typical first monomers may include the following, the first listed being preferred:

TABLE allyl glycidyl ether
glycidyl methacrylate
2-methallyl glycidyl ether
p-glycidyl styrene
styrene-p-glycidyl ether
3,4-epoxy-1-pentene
3,4-epoxy-1-butene

THE GRAFTING PROCESS

When the charge or base polymer is one which may be readily graft polymerized, as is the case with polymers typified by EPR or EPT polymers, then the first monomer may be introduced by graft polymerization.

The grafting of the graft monomer may be carried out by adding polymer to diluent-solvent in the reaction vessel which is then heated at 80° C.–160° C. to form a homogenous solution. There are then added graft monomer and free radical initiator in a molar ratio of monomer to initiator to polymer of 1:1–8:1, preferably 1.5:1–5:1. Free radical initiators, such as dicumyl peroxide, dibenzoyl peroxide, di-t-butyl peroxide, azobisisobutyronitrile, diacetyl peroxide, t-butyl peracetate, or diisopropyl peroxydicarbonate may be employed in the present process. The temperature of the solution is maintained above the decomposition temperature of the initiator for 0.25–5 hours, preferably 0.4–2 hours, under an inert atmosphere to form the desired product.

In a typical grafting reaction, a solution containing 25 parts of ethylene-propylene copolymer and 75 parts of solvent such as hexane or mineral oil is prepared. Then 25 parts of a graft monomer and 1 part of dicumyl peroxide are added and maintained in the presence of nitrogen at temperature of 155±5° C. and atmospheric pressure (when mineral oil is a solvent) for 1 hour. Enough mineral oil is then added to obtain a fluid concentrate at room temperature. When the grafting is carried out in hexane, a stripping step is included.

The product graft polymer may contain 0.3–20 mole %, preferably 0.5–10 mole %, say 2 mole % derived from the graft monomer.

Typical graft polymer configurations may include (when the graft monomer is glycidyl methacrylate):

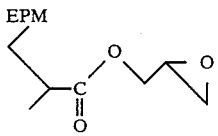

or when the graft monomer is allyl glycidyl ether:

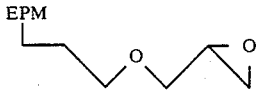

THE COPOLYMERIZATION PROCESS

When it is desired to utilize a polymer backbone of which the monomer is copolymerizable with first monomer, as is the case with polymers formed from acrylates or methacrylates, then the first monomer may be introduced by copolymerization.

This may be effected by adding first monomer, typified by allyl glycidyl methacrylate, and copolymerizable monomer(s) typified by methyl methacrylate or a mixture of lauryl methacrylate and stearyl methacrylate to the reaction vessel. The mole ratio of first monomer to copolymerizable monomers may be 0.02–0.3:1, preferably 0.05–0.2:1, say 0.1:1.

The reaction vessel contains inert diluent-solvent such as 145 PPTS.HF oil in amount sufficient to yield a 50–90 w%, say 85 w% solution. There is also added 0.01–0.10 w%, say 0.06 w% (based on total monomer) of chain transfer agent—typically lauryl mercaptan. After purging with inert gas, typically nitrogen of 20–60 minutes, say 30 minutes, and heating to initiation temperature of 80° C.–100° C., say 83° C., there is added a first aliquot of 0.01–0.10 w%, say 0.036 parts of initiator, typically azobisisobutyronitrile (AIBN).

Reaction proceeds for 2–6 hours, say 3 hours at initiation temperature. There are then added a second aliquot (equal in amount to the first) of initiator and diluent, typically 100 E Pale oil to yield a mixture containing 30–70 w%, typically 50 w% of polymer. The reaction mixture is maintained at the temperature for 1–3 hours, say 1.5 hours; the temperature is then raised to 95° C.–130° C., say 100° C. for 30–240 minutes, say 60 minutes, after which the reaction mixture is cooled to room temperature.

THE FUNCTIONALIZING MANNICH BASE

The polyamine compositions which may be employed in practice of the process of this invention to prepare the functionalizing Mannich base according to certain of its aspects may include primary or secondary polyamines. The polyamines may typically be characterized by the formula

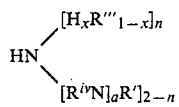

In this formula, a may be a number 1–20, preferably 1–10, say 5; x is 0 or 1; and n may be 0 or 1.

In the above compound, R''' may be hydrogen or a hydrocarbon group selected from the group consisting of alkyl, aralkyl, cycloalkyl, aryl, and alkaryl, including such radicals when inertly substituted. When R''' is alkyl, it may typically be methyl, ethyl, n-propyl, isopropyl, n-butyl, i-butyl, sec-butyl, amyl, octyl, decyl, octadecyl, etc. When R''' is a aralkyl, it may typically be benzyl, beta-phenylethyl, etc. When R''' is cycloalkyl, it may typically be cyclohexyl, cycloheptyl, cyclooctyl, 2-methylcycloheptyl,3-butylcyclohexyl, 3-methylcyclohexyl, etc. When R''' is aryl, it may typically be phenyl, naphthyl, etc. When R''' is alkaryl, it may typically be tolyl, xylyl, etc. R''' may be inertly substituted i.e. it may bear a non-reactive substituent such as alkyl, aryl, cycloalkyl, ether, etc. Typically inertly substituted R''' groups may include 2-ethoxyethyl, carboethoxymethyl, 4-methyl cyclohexyl, etc. The preferred R''' groups may be hydrogen or lower alkyl, i.e. $C_1$–$C_{10}$ alkyl, groups including eg methyl, ethyl, n-propyl, i- propyl, butyls, amyls, hexyls, octyls, decyls, etc. R''' may preferably be hydrogen.

R$^{iv}$ may be a hydrocarbon selected from the same group as R''' subject to the proviso that R$^{iv}$ is divalent and contains one less hydrogen atom. R$^{iv}$ may be alkylene, alkarylene, aralkylene, cycloalkylene, or arylene. In an alternative embodiment, R$^{iv}$ may together with the nitrogen atoms may form a cycloaliphatic, heterocyclic, or an aromatic ring typified by piperazine

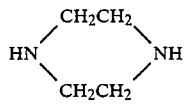

Typical polyamines which may be employed may include the following:

TABLE propylenediamine
diethylenetriamine
di-isopropylenetriamine
triethylenetetramine
tetraethylenepentamine
pentaethylenehexamine
piperazine
N-aminomethyl piperazine
N-(beta-aminoethyl) piperazine
N-hydroxy piperazine In one embodiment, R''' may be hydrogen and R$^{iv}$ —CH$_2$CH$_2$—. It is preferred however that the amine be a piperazine, preferably, N-(beta-aminoethyl) piperazine.

The charge aldehyde which may be employed may include those preferably characterized by the formula R$^5$CHO.

In the above compound, R$^5$ may be hydrogen or a hydrocarbon group selected from the group consisting of alkyl, aralkyl, cycloalkyl, aryl, alkaryl, including such radicals when inertly substituted. When R$^5$ is alkyl, it may typically be methyl, ethyl, n-propyl, iso-propyl, n-butyl, i-butyl, sec-butyl, amyl, octyl, decyl, octadecyl, etc. When R$^5$ is aralkyl, it may typically be benzyl, beta-phenylethyl, etc. When R$^5$ is cycloalkyl, it may typically be cyclohexyl, cycloheptyl, cyclooctyl, 2-methylcycloheptyl, 3-butylcyclohexyl, 3-methylcyclohexyl, etc. When R$^5$ is aryl, it may typically be phenyl, naphthyl, etc. When R$^5$ is alkaryl, it may typically be tolyl, xylyl, etc. R$^5$ may be inertly substituted i.e. it may bear a non-reactive substituent such as alkyl, aryl, cycloalkyl, ether, etc. Typically inertly substituted R$^5$ groups may include 2-ethoxyethyl, carboethoxymethyl, 4-methyl cyclohexyl, etc. The preferred R$^5$ groups may be lower alkyl, i.e. C$_1$-C$_{10}$ alkyl, groups including eg methyl, ethyl, n-propyl, i-propyl, etc R$^5$ may preferably be hydrogen.

Typical aldehydes which may be employed may include the following:

TABLE formaldehyde
ethanal
propanal
butanal etc.

The preferred aldehyde may be formaldehyde employed as its polymer paraformaldehyde.

The charge non-hindered alkyl phenols which may be employed in practice of the process of this invention may preferably be characterized by the formula.

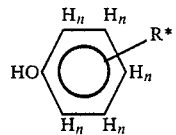

In this formula R* may be an alkyl group preferably containing 1-16, say 9 carbon atoms—as this imparts maximum oil solubility. R* is preferably in the position para- to the hydroxy group. n is 0 or 1.

At least one n is equal to 1 i.e. at least one of the ortho- or meta- or para- hydrogens will be present as this is the active hydrogen at which reaction occurs. The other n subscripts may be 0 or 1 i.e. the other hydrogen atoms may be present (in which case they may be active and may participate in the reaction) or alternatively they may be absent, having been replaced by an inert group which does not interfere with the reaction.

The preferred of these non-hindered phenols may be those which have one ortho- hydrogen present (more preferably those which have both ortho- hydrogens present) and which bear an R* (preferably a C$_9$ group in the position para- to the phenol hydroxyl group.

It is a feature of these phenols that they contain an active hydrogen which will be the site for substitution. Polyphenols (eg compounds containing more than one hydroxy group in the molecule whether on the same ring or not) may be employed. The rings on which the hydroxy groups are sited may bear inert substituents. However at least one position which may be meta-, but which is preferably ortho- or para- to a phenol hydroxy group, must be occupied by an active hydrogen as this is the point of reaction with the aldehyde group. Preferably both positions ortho to the hydroxy will be unsubstituted and the alkyl group will be in the para-position.

Typical phenols which may be employed include:

TABLE p-nonyl phenol
o-nonyl phenol
m-nonyl phenol
p-methyl phenol
o-ethyl phenol
m-butyl phenol
4-nonyl-1,2-dihydroxybenzene
4-nonyl-1,2-dihydroxybenzene
4-hexyl-1,3-dihydroxybenzene The preferred non-hindered phenol is p-nonyl phenol. A particularly preferred phenol is that commercially available under the designation nonyl phenol which is a mixture of isomers which contains one nonyl group per benzene ring.

It is a feature of this invention that although these non-hindered phenols se possess little or no anti-oxidant ability, they do (when reacted as herein described) contribute anti-oxidancy to the final composition. This may be because reaction occurs in a manner to bond the phenol in at least one and preferably both positions which are ortho to the phenol hydroxy group.

Reaction to form the phenol-amine-aldehyde Mannich condensate may be effected by adding 0.1-1.5 moles, say 1.1 moles of aldehyde and 0.1-1.3 moles, say 1 mole of amine and 0.1-1.3 moles, say 1 mole of phenol in one embodiment. In another preferred embodiment wherein the phenol contains two unsubstituted ortho-hydrogen atoms, the amount of amine may be twice as great—viz 0.2–2.6, say 2 moles of amine. In one preferred embodiment, 2.2 moles of formaldehyde (as paraformaldehyde) may react with one mole of nonyl phenol and 2 moles of N-aminoethyl piperazine.

Reaction is preferably effected by adding the reactants (preferably the aldehyde is added last) to a reaction operation under a blanket of inert gas, typically nitrogen. The reaction mixture is maintained at 80° C.–160° C., say about 100° C. for 0.5–5 hours, say 2 hours.

Typical reaction (in which for simplicity $R^6$ represents the aromatic-ring-bearing portion of the molecule which bears the phenol hydroxy group as well as an active hydrogen) may be as follows:

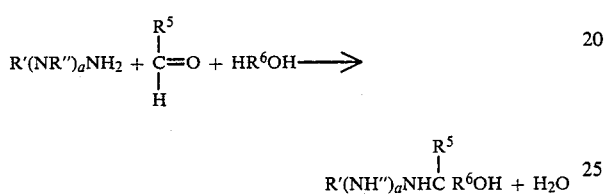

In a specific embodiment, the reaction may be as follows:

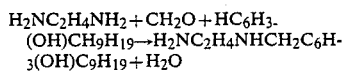

In a more preferred embodiment, the reaction may typically be:

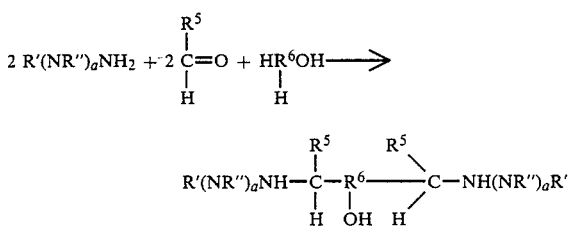

In one specific embodiment, the reaction may be as follows:

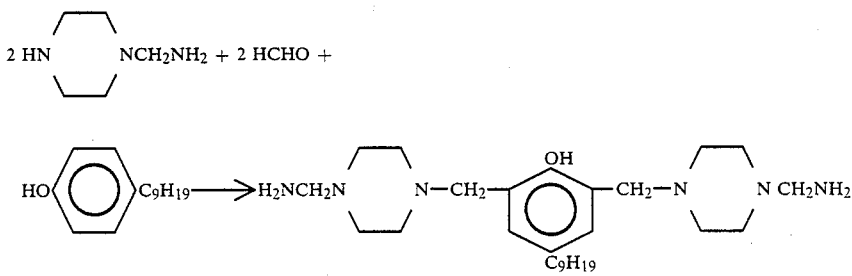

Illustrative phenol-amine-aldehyde Mannich base condensates which may be so formed include the following the last listed being preferred:

TABLE

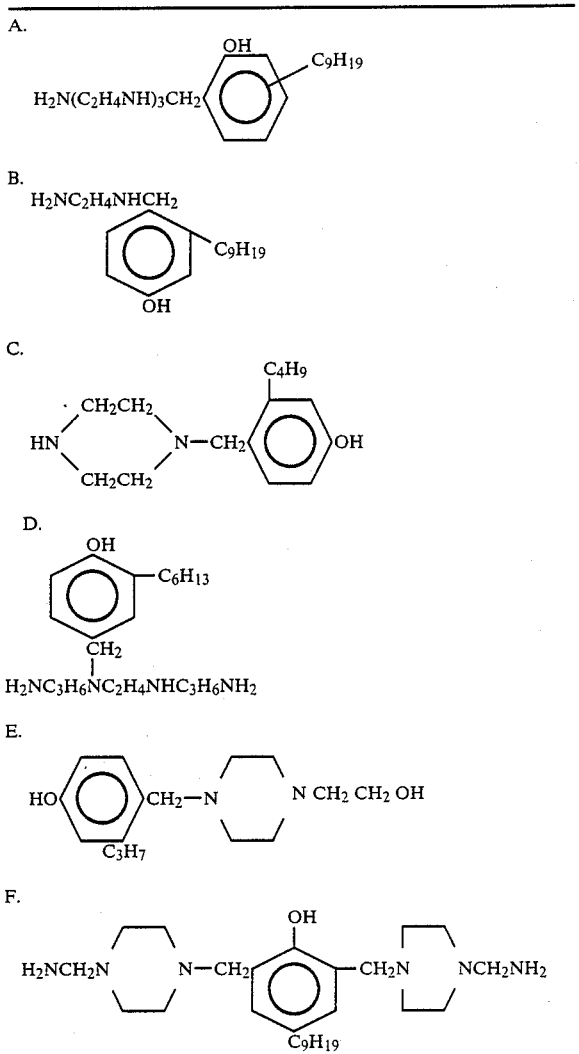

THE FUNCTIONALIZING AMINE

The polyamine which may be used to functionalize the polymer may be a polyamine containing at least one Zerewitinoff-active hydrogen atom bonded to a nitrogen atom. Typically the amine will thus contain at least one primary or secondary amine group. One type of polyamine which may be employed may be characterized by the formula

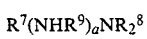

In the above compound, $R^7$ may be a hydrocarbon group selected from the group consisting of alkyl, aralkyl, cycloalkyl, aryl, and alkaryl including such radicals when inertly substituted. When $R^7$ is alkyl, it may typically be methyl, ethyl, n-propyl, iso-propyl, n-butyl, sec-butyl, amyl, octyl, decyl, octadecyl, etc. When $R^7$ is aralkyl, it may typically be benzyl, beta-phenylethyl, etc. When $R^7$ is cycloalkyl, it may typically be cyclohexyl, cycloheptyl, cyclooctyl, 2-methyl-cycloheptyl, 3-butycyclohexyl, 3-methylcyclohexyl, etc. When $R^7$ is aryl, it may typically be phenyl, naphthyl, etc. When $R^7$ is alkaryl, it may typically be tolyl, xylyl, etc. $R^7$ may be inertly substituted i.e. it may bear a non-reactive substituent such as alkyl, aryl, cycloalkyl, ether, etc. Typically inertly substituted $R^7$ groups may include 2-ethoxyethyl, carboethoxymethyl, 4-methyl cyclohexyl, etc. The preferred $R^7$ groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. $R^7$ may typically be methyl or hydrogen.

$R^8$ may be hydrogen or selected from the same groups as that form which $R^7$ is selected. $R^8$ is typically methyl.

In the above formula, $R^9$ may be a hydrocarbon group selected from the group consisting of alkylene, aralkylene, cycloalkylene, arylene and alkarylene including such radicals when inertly substituted. When $R^9$ is alkylene, it may typically be methylene, ethylene, n-propylene, iso-propylene, n-butylene, i-butylene, sec-butylene, amylene, octylene, decylene, octadecylene, etc. When $R^9$ is aralkylene it may typically be benzylene, beta-phenylethylene, etc. When $R^9$ is cycloalkylene, it may typically be cyclohexylene, cycloheptylene, cyclooctylene, 2-methylcycloheptylene, 3-butylcyclohexylene, 3-methylcyclohexylene, etc. When $R^9$ is arylene, it may typically be phenylene, naphthylene, etc. When $R^9$ is alkarylene, it may typically be tolylene, xylylene, etc. $R^9$ may be inertly substituted i.e. it may bear a non-reactive substituent such as alkyl, aryl, cycloalkyl, ether, etc. Typically inertly substituted $R^9$ groups may include 3-methoxypropylene, 2-ethoxyethylene, carboethoxymethylene, 4-methylcyclohexylene, etc. The preferred $R^9$ groups may be lower alkylene, i.e. $C_1$–$C_{10}$ alkylene, groups including eg methylene, ethylene, n-propylene, i-propylene, butylene, amylene, hexylene, octylene, decylene, etc. $R^9$ may typically be ethylene $—CH_2—CH_2—$.

a may be 0–20, preferably 0–6, say 1.

Typical of such amines which may be employed may be the following:

TABLE ethylenediamine
diethylenetriamine
triethylenetetramine
tetraethylenepentamine
3-(N,N-dimethylamino)propylamine
dimethylaminopropylamine Preferred of the above amines is dimethylaminopropylamine i.e. 3-(N,N-dimethylamino)propylamine.

The preferred type of polyamines containing Zerewitinoff-active hydrogen atom bonded to a nitrogen atom may be heterocyclic nitrogen-containing compounds wherein at least one nitrogen atom is within the heterocyclic ring. Typical of these may be the following, the first two listed being preferred:

TABLE

N-vinylpyrrolidone

N-methylpiperazine p-aminopyridine

FUNCTIONALIZATION

Derivatization or functionalization of the polymer may be carried out under functionalizing conditions in liquid phase preferably by adding to the polymer (typically in inert diluent-solvent as recovered from polymerization) (i) the functionalizing polyamine and (ii) the functionalizing Mannich base.

Functionalization with the polyamine and with the Mannich base may be effected in either order or preferably simultaneously. When the functionalizations are carried out separately, similar reaction conditions may be employed.

The amine may be added to the polymer in amount of 0.1–1.5 moles, say 0.5 moles per mole of polymer. The Mannich base may be added to the polymer in amount of 0.25–2 moles, say 1.5 moles per mole of polymer. Preferably the mole ratio of functionalizing polyamine to Mannich base to the polymer may be 0.1:1:1–3:1:1, say 0.33:1:1.

The reaction mixture, preferably under inert (eg nitrogen) atmosphere is heated to 80° C.–200° C., say about 160° C. for 1–4 hours, say about 1 hour preferably at atmospheric pressure. At the end of this time, the reaction mixture is cooled.

During the reaction, the functionalizing amine and the Mannich base become bonded to the polymer to form products which may include those having a structure typified by the following:

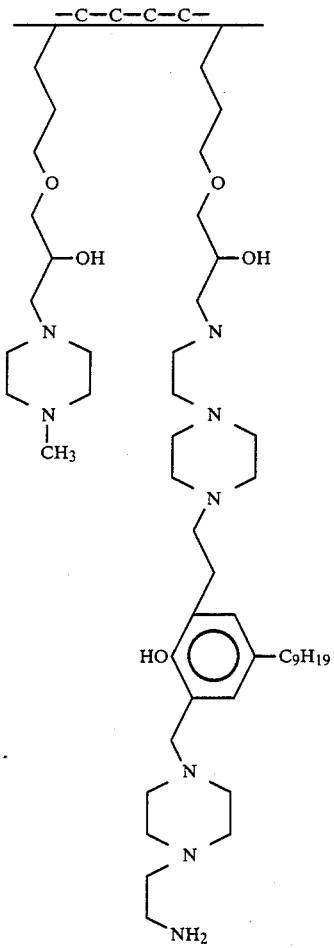

It should be noted that it is believed that the functionalizing amine (eg N-methylpiperazine) becomes bonded to certain of the opened epoxy groups grafted onto the backbone and that the Mannich base becomes bonded, through, one amine nitrogen thereof, to certain other of the opened epoxy groups. It should also be noted that the preferred Mannich base (prepared from a phenol which has two available active ortho- hydrogen atoms) contains two amine-derived moieties bonded through the formaldehyde-derived methylene group. It is believed that this development of a composition which is similar to a hindered phenol may contribute to the antioxidancy of the product. Functionalization with a Mannich base containing eg a residue derived from a phenol having a non-hindering group (eg a methyl group) in one position ortho- to the hydroxy group, and thus only one aldehyde-bonded amine moiety, yields a product of lesser antioxidancy.

The functionalized polymer may contain, per 1000 carbon atoms in the backbone, polyamine in amount of 0.002–0.1 moles, preferably 0.0025–0.025, say 0.02 moles and Mannich base in amount of 0.005–0.3 moles, preferably 0.0075–0.075, say 0.05 moles.

The product so prepared is typically a solution containing 25–80 w%, say 50 w% of functionalized copolymer in inert diluent-solvent. In preferred operation, it may be employed as so prepared with no further work up. For convenience of handling if desired it may be diluted to a concentration of 10–50 w%, say 20 w% by addition of additional diluent-solvent which may be the same as that employed in the reaction—or it may be a lubricating oil cut such as that in which the product may be formulated. It may readily be handled in the form of such a concentrate.

LUBRICATING COMPOSITION

It is a feature of this invention that the polymer product so prepared may be added in minor effective portion to a major portion of a lubricating oil; and the lubricating compositions so prepared may be found to possess superior properties:

The lubricating oils which may be treated by the process of this invention may include oils intended for use in automotive, railroad, marine, aircraft, etc; spark ignition or compression ignition; winter or summer; heavy duty or light duty; etc. The oil may be a hydrocarbon, ester, or silicone, etc. composition.

A typical lubricating oil in which the polymer of this invention may be present, may be a standard SAE 5W-30 hydrocarbon motor oil having the following components:

TABLE

| | | W % |
|---|---|---|
| Solvent Neutral Oil | 100 sus | 80 |
| Kin. Visc. 40° C. (cSt) | 2 | |
| 100° C. (cSt) | 4.0 | |
| Pour Point (°F.) | 0 to +10 | |
| Viscosity Index Improver (ethylene-propylene copolymer) | | 11 |
| Standard Additive Package | | 9 |
| Polyisobutyenyl ($M_n$ 1290) succinimide (dispersant and anti-wear) | | |
| calcium sulfonate (detergent) | | |
| Zinc dithiophosphate (anti-wear) | | |
| di-nonyl diphenyl amine (anti-oxidant) | | |
| 4,4'-methylene-bis (2,6-di-t-butyl phenol) (anti-oxidant) | | |
| polyethoxy phenol (anti-wear) | | |

It is a feature of this invention that the novel polymer may serve as a multifunctional lube oil additive. Generally the additive may be present in amounts ranging from as little as 0.005 w% up to as much as say 10%. Smaller quantities will only give desired improvement to a lesser degree; and larger quantities may not generally be recommended.

When it is to be used as a sole dispersant, it may be present in effective amount of 2–10 wt%, say about 5 w%. When it is to be used as sole viscosity index improver, it may be present in effective amount of 2–10 w%, say about 5 w%. When it is to be used as the sole antioxidant, it may be present in amount of 0.005–2 w%, say about 0.5 w%.

When it is intended that the additive polymer serve to provide all of these functions, as a supplement to a standard system, the effective amount may be 0.005–5 w%, say about 0.7 w% based on total lubricating composition. When employed in this manner, it may be used to upgrade prior art viscosity index improver dispersant system.

THE BENCH VC TEST (BVCT) FOR DISPERSANCY

The ability of this polymer to serve as a dispersant additive may be measured by the Bench VC Test (BVCT), in which the turbidity of a standard lubricating oil is measured after addition of synthetic blow-by. A turbidity comparable to that of the Good reference or below indicates a candidate for further consideration.

When compared to the standards (Excellent, Good, Fair) of the Bench VT Test, lubricating oils containing the additives of this invention consistently show high performance characteristics to a degree surpassing control formulations.

VISCOSITY INDEX

The ability of this polymer to serve as a viscosity index improver may be measured by ASTM Test D-445.

THE SEQUENCE VD TEST FOR DISPERSANCY

This test, using a 2.3 liter Ford OHC four-cylinder engine at low to mid-range speeds and oil temperatures, simulates stop and go urban and moderate freeway driving. Test duration is 192 hours and is run on unleaded gasoline with exhaust gas recirculation (EGR).

Oil characteristics evaluated are:
(a) sludge deposits
(b) varnish deposits
(c) oil ring clogging
(d) oil screen plugging
(e) cam wear The standard lubricating oils containing the formulations of this invention satisfactorily pass the Sequence VD Test and are found to be superior to control formulations.

THE SEQUENCE III D TEST FOR OXIDATION STABILITY

This test uses a 1977, 350 CID (5.7 liter) Oldsmobile V-8 engine at high speed (3,000 rpm) and high oil temperature 300° F. (149° C.) for 64 hours with oil additions permitted. The test is run with leaded gasoline.

Oil characteristics evaluated for the tested lubricating oils containing the test additives include:
(a) high temperature oil oxidation
(b) sludge and varnish deposits
(c) engine wear (cam and lifter)

THE MWM-B TEST FOR DIESEL ENGINE PERFORMANCE

A single cylinder 850 cm$^3$ naturally aspirated diesel engine is used. The test evaluates piston cleanliness attained when using a standard lubricating oil containing the test additives. Duration is 50 hours @ 2,200 rpm with oil sump temperature 110° C. (230° F.).

DESCRIPTION OF SPECIFIC EMBODIMENT

Practice of this invention will be apparent to those skilled in the art from the following wherein, as elsewhere on this specification, all parts are parts be weight unless otherwise stated. An asterisk indicates a control example.

EXAMPLE I

PREPARATION OF GRAFT POLYMER

In this example which represents the best mode of practicing the invention presently known, there is added to a reaction mixture, 26 parts of the Epsyn brand of ethylene-propylene copolymer containing 55 mole percent of units derived from ethylene and 45 mole percent of units derived from propylene-$\overline{M}_n$ of 100,000 and $\overline{M}_w/\overline{M}_n$ of 1.6, in solution in 74 parts of commercial hexane. The reaction mixture is heated to 155° C. and 200 psig and there is added 3 parts of N-Vinyl Pyrrolidone dissolved in 10 parts of commercial hexane followed by 1 part of dicumyl peroxide in 3 parts of commercial hexane. The mixture is maintained at 155° C. for one (1) hour with agitation.

There are then added 1.7 parts of allyl glycidyl ether graft monomer as a 50 w% solution in commercial hexane and then 0.5 parts of dicumyl peroxide as a 25 w% solution in commercial hexane. The mixture is stirred at 155° C. for one hour to yield graft polymer containing approximately 0.9 moles of epoxy groups per 1000 units of polymer molecular weight ($\overline{M}_n$ 100,000).

PREPARATION OF FUNCTIONALIZING MANNICH BASE

Functionalizing Mannich base is prepared by adding to a separable reaction mixture under nitrogen 40 parts of para-nonyl phenol, and 48 parts of N-(aminoethyl) piperazine. As the reaction mixture is agitated at 20° C., there are slowly added over 30 minutes, 12 parts of paraformaldehyde. The mole ratio of piperazine to formaldehyde to phenol is 2:2.2:1.

The reaction mixture is heated to 120° C. and refluxed at that temperature for two hours and filtered to remove excess unreacted paraformaldehyde, and then cooled to ambient temperature of 25° C. The product Mannich base is identified by Gas Chromatography-Mass Spectroscopy (GC-MS) and by Nuclear Magnetic Resonance (NMR).

FUNCTIONALIZATION

There are added to the solution of graft polymer containing 100 parts of polymer, 7.5 parts of functionalizing Mannich base.

The reaction mixture is maintained at 155° C. for one hour. The solvent hexane is then exchanged with 276 parts of SNO-100 oil. The final mixture contains 8.6 parts of active ingredient in 100 parts of oil.

EXAMPLE II

In this example, the procedure of Example I was followed except that
(i) the graft monomer was 4 parts of allyl glycidyl ether (instead of 1.7 parts as in Example I).
(ii) the functionalizing amine was 2 parts of N-methyl piperazine (instead of 3 parts of N-vinyl pyrrolidone), which are added together with functionalizing Mannich base.

EXAMPLE III*

In this control example, the procedure of Example I was followed except that:
(i) the graft monomer allyl glycidyl ether was present in amount of 2.3 parts (instead of 1.7 parts as in Example I);
(ii) the functionalizing amine was 2 parts of N-methyl piperazine (instead of 3 parts of N-vinyl pyrrolidone as in Example I); and
(iii) no functionalizing Mannich base was used.

EXAMPLE IV*

In this control example, the procedure of Example I was followed except that:
(i) no grafting of the polymer was carried out;
(ii) the functionalizing amine (N-vinyl pyrrolidone) was present in amount of 4 parts (instead of 3 parts as in Example I); and
(iii) no Mannich base was present.

Each of these products was tested for dispersancy in the BVCT; and the results were as follows:

| Example | Dispersancy | References |
|---|---|---|
| I | 16.4 | 7.0/19.0/55 |
| II | 26.6 | 11.7/31.0/69.5 |
| III* | 95.5 | 6.0/37.5/61.4 |
| IV* | 33.8 | 11.7/31.0/69.5 |

From the above, it will be seen that the formulations of Example I and II of this invention are satisfactory. Control Examples III* and IV*, which contain no Mannich base, show results which are worse than experimental Examples I–II.

The formulations of Control Example IV and experimental Example I were tested in the Sequence VD Test in several runs in a standard 10W-40 low p HS type oil lubricating oil containing different viscosity index improvers. Cam wear is measured in mils. Other measurements are on a scale of 1–10.

| Test | Example I Product | Example IV* Product | API Limit |
|---|---|---|---|
| Piston Skirt Varnish | 6.9 | 6.5 | 6.7 min |
| Average Varnish | 6.8 | 6.5 | 6.6 min |
| Average Sludge | 9.7 | 9.7 | 9.4 min |
| Cam Wear | | | |
| Average | 0.3 | 0.6 | 1.0 max |
| Max | 0.5 | 0.5 | 2.5 max |

From the above table, it is apparent that the formulations of Example I of the instant invention provided superior dispersancy than those of control Example IV, when used in the same lubricating oil in the same concentration. As may be seen, in the presence of certain viscosity index improvers, the control formulations containing the product of Example IV* did not measure up to the API limit.

When tested in a fully formulated 5W-30 Havoline type motor lubricating oil for oxidation stability by the Sequence III D Test, the following was noted:

| Example | % Viscosity Increase |
|---|---|
| I | 112 |
| IV* | 1014 |
| API Limit | 375 max |

From the above, it is clear that the formulation of this invention is satisfactory while the control formulation of Example IV is unsatisfactory.

When tested in a fully formulated 15W-40 Ursa Super Plus Type Diesel engine lubricating oil by the MWM-B Performance Test, the following was noted:

| Example | Merit Rating |
|---|---|
| I | 59 |
| IV* | 53 |

It is clear that lubricating oils containing the compositions of this invention show better performance than control Examples.

Results comparable to those attained by the formulation of Example I may be attained if the base copolymer is:

| Example | Polymer |
|---|---|
| V | The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a polydispersity index $\overline{M}_w/\overline{M}_n$ of 1.6 |
| VI | The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5. |
| VII | The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5. |
| VIII | The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index of 2.2. |

Results comparable to those attained by the formulation of Example I may be attained if the graft monomer is:

| Example | Graft Monomer |
|---|---|
| IX | glycidyl methacrylate |
| X | 2-methallyl glycidyl ether |
| XI | p-glycidyl styrene |
| XII | styrene-p-glycidyl ether |
| XIII | maleic acid anhydride |
| XIV | methacrylic acid |

Results comparable to those attained by the formulation of Example I may be attained of the functionalizing amine is:

| Example | Functionalizing Amine |
|---|---|
| XV | N—methyl piperazine |
| XVI | p-amino pyridine |
| XVII | ethylene diamine |
| XVIII | dimethylaminopropyl amine |

Results comparable to those attained by the formulation of Example I may be attained if the functionalizing Mannich base is:

| Example | Mannich Base |
|---|---|
| XIX | 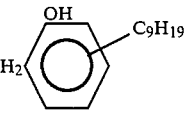 |

TABLE-continued

| Example | Mannich Base |
|---|---|
| XX | $H_2NC_2H_4NHCH_2$-(phenyl with $C_9H_{19}$ and OH substituents) |
| XXI | $HN(CH_2CH_2)_2N-CH_2$-(phenyl with $C_4H_9$ and OH) |
| XXII | (phenyl with OH, $C_6H_{13}$, and $CH_2$-$H_2NC_3H_6NC_2H_4NC_3H_6NH_2$) |
| XXIII | $HO$-(phenyl with $C_3H_7$)-$CH_2-N(piperazine)N\ CH_2\ CH_2\ OH$ |

Although this invention has been illustrated by reference to specific embodiments, it will be apparent to those skilled in the art that various changes and modifications may be made which clearly fall within the scope of this invention.

We claim:

1. A composition comprising a carbon-carbon backbone polymer containing residual unsaturation, and bearing graft moieties derived from a graft monomer containing ethylenic unsaturation and an epoxide moiety which graft polymer has been functionalized with, per mole of polymer, (a) 0.25–2 moles of a Mannich base formed by the reaction of (i) an aldehyde, (ii) a polyamine containing at least one primary or secondary amine group and (iii) a non-hindered phenol and with (b) 0.1–1.5 moles of N-vinyl pyrrolidone or a functionalizing polyamine bearing a Zerewitinoff active hydrogen atom bonded to a nitrogen atom.

2. A composition as claimed in claim 1 wherein said polymer is a polymer containing moieties derived from an olefin.

3. A composition as claimed in claim 1 wherein said polymer is a copolymer of ethylene and propylene.

4. A composition as claimed in claim 1 wherein said polymer is a copolymer of ethylene and propylene and diene third monomer.

5. A composition as claimed in claim 1 wherein said polymer is a polymer containing moieties derived from an acrylate.

6. A composition as claimed in claim 1 wherein said polymer bears graft moieties derived from allyl glycidyl ether.

7. A composition as claimed in claim 1 wherein said polymer bears graft moieties derived from glycidyl methacrylate.

8. A composition as claimed in claim 1 wherein said polymer bears graft moieties derived from maleic acid anhydride.

9. A composition as claimed in claim 1 wherein said polymer bears graft moieties derived from methacrylic acid.

10. A composition comprising a carbon-carbon backbone polymer containing residual unsaturation and bearing graft moieties derived from monomer containing ethylenic unsaturation and an epoxide moiety which polymer has been functionalized with, per mole of polymer, (a) 0.25–2 moles of a Mannich base formed by the reaction of (i) an aldehyde, (ii) a polyamine containing at least one primary or secondary amine group and (iii) a non-hindered phenol and with (b) 0.1–1.5 moles of N-vinyl pyrrolidone or a functionalizing polyamine bearing a Zerewitinoff active hydrogen atom bonded to a nitrogen atom.

11. A concentrate comprising a diluent-solvent and a composition comprising a carbon-carbon backbone polymer containing residual unsaturation, and bearing graft moieties derived from a graft monomer containing unsaturation and an epoxide moiety which graft polymer has been functionalized with, per mole of polymer, (a) 0.25–2 moles of a Mannich base formed by the reaction of (i) an aldehyde, (ii) a polyamine containing at least one primary or secondary amine group and (iii) a non-hindered phenol with (b) 0.1–1.5 moles of N-vinyl pyrrolidone or a functionalizing polyamine bearing a Zerewitinoff active hydrogen atom bonded to a nitrogen atom.

12. A lubricating composition comprising a major portion of a lubricating oil and a minor effective viscosity index improving portion of a composition comprising a carbon-carbon backbone polymer containing residual unsaturation, and bearing graft moieties derived from a graft monomer containing ethylenic unsaturation and an epoxide moiety which graft polymer has been functionalized with, per mole of polymer, (a) 0.25–2 moles of a Mannich base formed by the reaction of (i) an aldehyde, (ii) a polyamine containing at least one primary or secondary amine group and (iii) a non-hindered phenol and with (b) 0.1–1.5 moles of N-vinyl pyrrolidone or a functionalizing polyamine bearing a Zerewitinoff active hydrogen atom bonded to a nitrogen atom.

13. A lubricating composition as claimed in claim 12 wherein said minor effective portion is 0.005–10 w%.

14. A lubricating composition as claimed in claim 12 wherein said minor effective portion is 2–10%.

15. A lubricating composition as claimed in claim 12 wherein said minor effective portion is 0.005–5%.

16. A lubricating composition as claimed in claim 12 wherein said minor effective portion is 0.005–2%.

17. A lubricating composition as claimed in claim 12 wherein said polymer is a polymer containing moieties derived from an olefin.

18. A lubricating composition as claimed in claim 12 wherein said polymer is a copolymer of ethylene and propylene.

19. A lubricating composition as claimed in claim 12 wherein said polymer is a copolymer of ethylene and propylene and diene third monomer.

20. A lubricating composition as claimed in claim 12 wherein said polymer is a polymer containing moieties derived from an acrylate.

21. A lubricating composition as claimed in claim 12 wherein said polymer bears graft moieties derived from allyl glycidyl ether.

22. A lubricating composition as claimed in claim 12 wherein said polymer bears graft moieties derived from glycidyl methacrylate.

23. A lubricating composition as claimed in claim 12 wherein said polymer bears graft moieties derived from maleic acid anhydride.

24. A lubricating composition as claimed in claim 12 wherein said polymer bears graft moieties derived from methacrylic acid.

25. A graft polymer composition comprising a carbon-carbon backbone polymer containing residual unsaturation, and bearing graft moieties derived from a graft monomer containing ethylenic unsaturation and an epoxide moiety which graft polymer has been functionalized with (a) a Mannich base formed by the reaction of (i) an aldehyde, (ii) a polyamine containing at least one primary or secondary amine group and (iii) a non-hindered phenol and with (b) N-vinyl pyrrolidone.

26. A graft polymer composition comprising a carbon-carbon backbone polymer containing residual unsaturated containing moieties derived from monomer containing ethylenic unsaturation and an epoxide moiety which polymer has been functionalized with (a) a Mannich base formed by the reaction of (i) an aldehyde, (ii) a polyamine containing at least one primary or secondary amine group and (iii) a non-hindered phenol and with (b) N-vinyl pyrrolidone.

27. A concentrate comprising a diluent-solvent and a graft polymer composition comprising a carbon-carbon backbone polymer containing residual unsaturation, and bearing graft moieties derived from a graft monomer containing ethylenic unsaturation and a epoxide moiety which graft polymer has been functionalized with (a) a Mannich base formed by the reaction of (i) an aldehyde, (ii) a polyamine containing at least one primary or secondary amine group and (iii) a non-hindered phenol and with (b) N-vinyl pyrrolidone.

* * * * *